United States Patent [19]

Meyer

[11] 4,085,524
[45] Apr. 25, 1978

[54] SIMULATED DIGITAL RADAR SYSTEM WITH EARTH CURVATURE AND ATMOSPHERIC EFFECTS

[75] Inventor: Jerome W. Meyer, Santa Clara, Calif.

[73] Assignee: The Singer Company, Binghamton, N.Y.

[21] Appl. No.: 692,817

[22] Filed: Jun. 4, 1976

Related U.S. Application Data

[62] Division of Ser. No. 499,302, Aug. 21, 1974, abandoned.

[51] Int. Cl.$^2$ .............................................. G01S 9/00
[52] U.S. Cl. .................................................. 35/10.4
[58] Field of Search ...................................... 35/10.4

[56] References Cited

U.S. PATENT DOCUMENTS

| | | | |
|---|---|---|---|
| 2,993,644 | 7/1961 | Resnick | 235/186 |
| 3,090,135 | 5/1963 | Eisenberg | 35/10.4 |
| 3,131,247 | 4/1964 | Benamy et al. | 35/10.4 |
| 3,446,903 | 5/1969 | Bezzer | 35/10.4 |
| 3,885,323 | 5/1975 | Kaase et al. | 35/10.4 |

Primary Examiner—Malcolm F. Hubler

Attorney, Agent, or Firm—Paul Hentzel; James C. Kesterson

[57] ABSTRACT

A training cockpit on a hydraulic motion system is responsive to the cockpit controls to simulate an aircraft in flight. A simulated radar display of the aircraft vicinity is provided from a data base memory of the topographic and cultural data of the gaming area.

As the antenna scans, particular blocks of data are transferred from the district memory to smaller sector core memories at high speed access and transfer rates. The sector memory provides a line of data for each sweep of the simulated radar. Reflectance and elevational data is retrieved from the sector memories and processed, one sweep at a time, through digital radar equation computation equipment which calculates the brightness of each spot in the simulated radar display. This digital brightness data is processed through an earth curvature subsystem which modifies the brightness in accordance with the horizon effect. The modified brightness is applied to a digital to analog converter and then to the radar display. A central computer coordinates the data flow with the flight parameters-position, speed, altitude, direction, etc., of the simulated aircraft.

5 Claims, 5 Drawing Figures

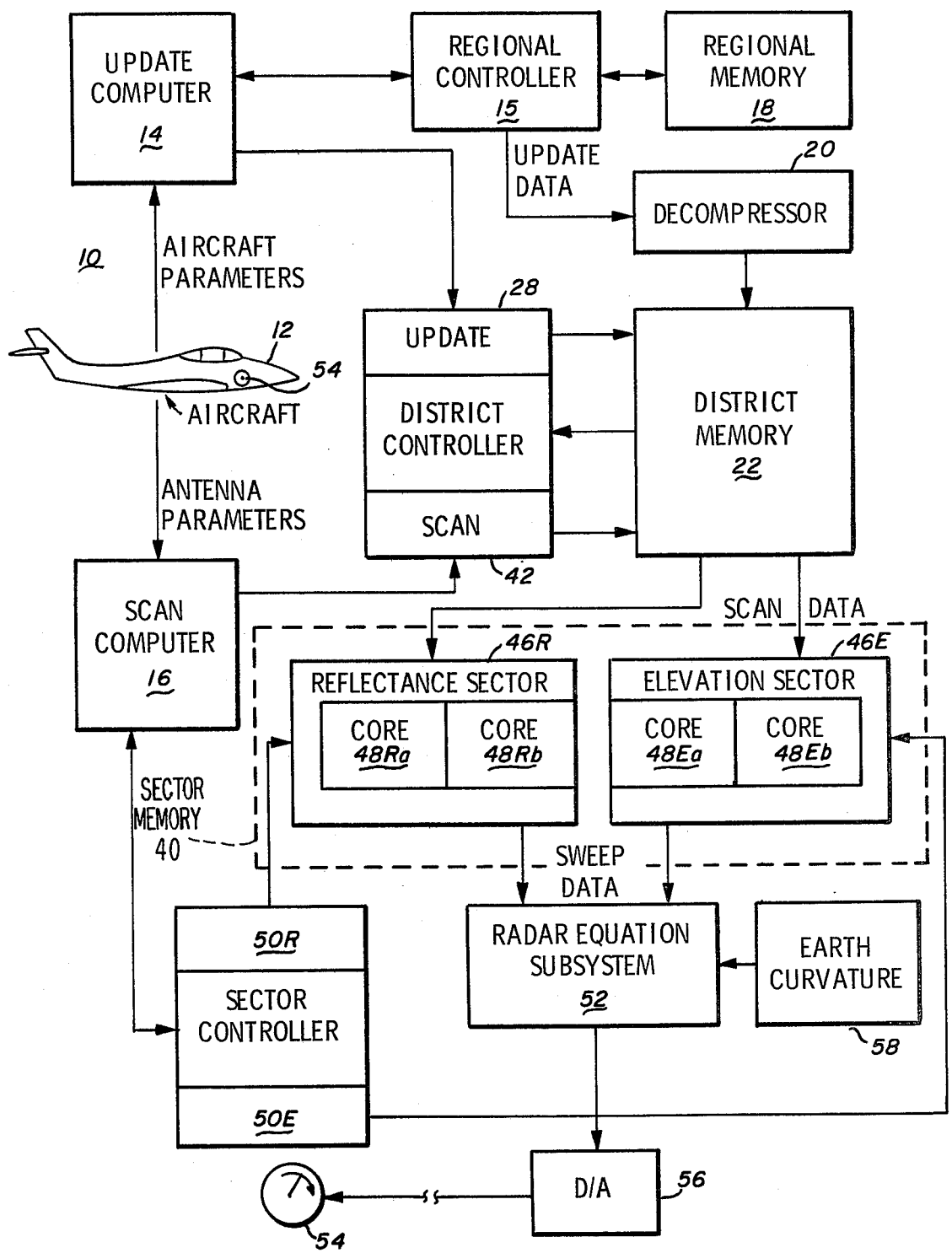
Fig_1

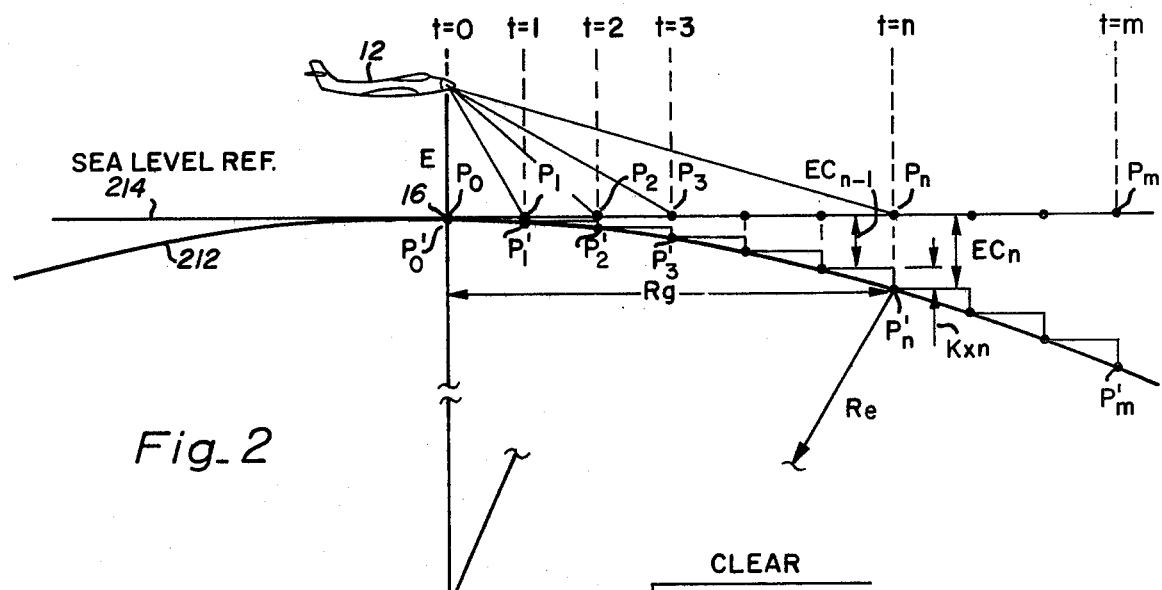
Fig._2
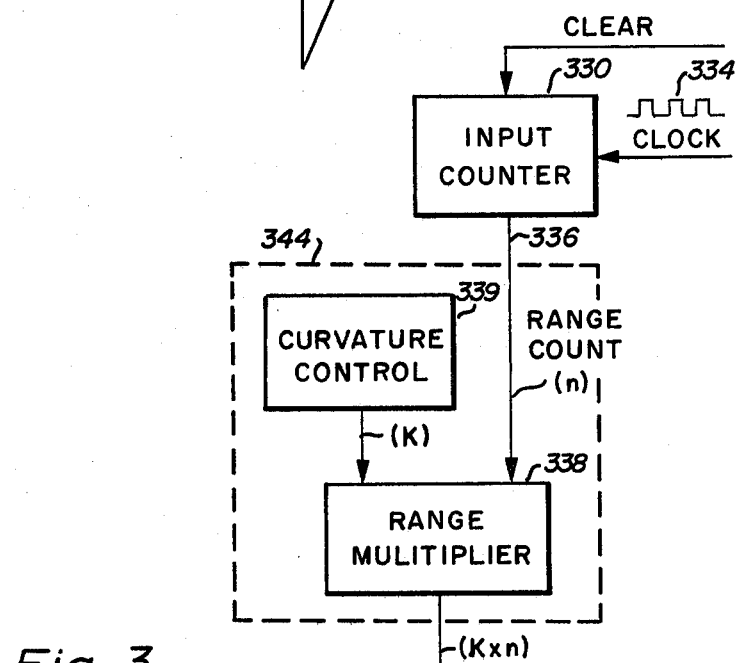
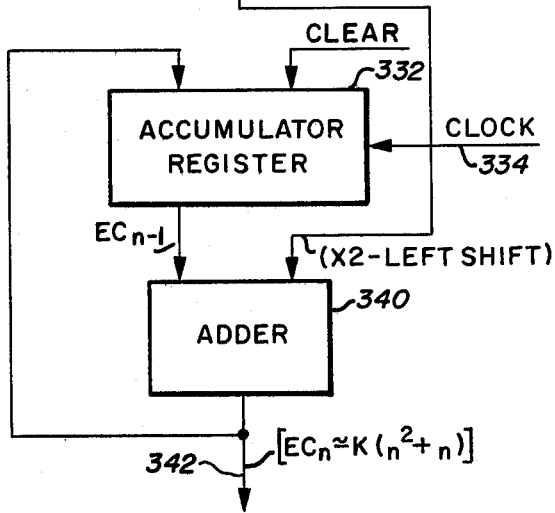
Fig._3

SIMULATED DIGITAL RADAR SYSTEM WITH EARTH CURVATURE AND ATMOSPHERIC EFFECTS

This is a division, of application Ser. No. 499,302, filed Aug. 21, 1974 now abandoned.

FIELD OF INVENTION

This invention relates to an earth curvature subsystem for simulated digital radar system.

SUMMARY OF THE INVENTION

It is, therefore, an object of this invention to provide earth curvature and atmospheric effects for a simulated digital radar system.

BRIEF DESCRIPTION OF THE FIGURES

Further objects and advantages of the present invention will become apparent from the following detailed description taken in conjunction with the drawings in which:

FIG. 1 is a block diagram of a DRLMS with an earth curvature subsystem;

FIG. 2 is a schematic view of an aircraft in simulated flight showing an exaggerated effect of the earth's curvature;

FIG. 3 is a block diagram of circuit which approximates the earth curvature effect at each data point along a radar sweep line and includes simulation of atmospheric effects;

FIG. 1 shows a block diagram of the digital radar system 10. An aircraft 12 in simulated flight forwards flight motion data or "aircraft parameters" to a district memory update computer 14, and forwards antenna scan motion or "antenna parameters" to a radar scan generation computer 16. Update computer 14 has a regional controller 15 which transfers data from a regional memory 18 through a data decompressor 20 to update a district memory 22. Regional memory 18 is a suitable high volume memory device such as a moving head disc for retaining the radar detectable features of the gaming area. Regional controller 15 is the hardware interface between regional memory 18 and update computer 14. Controller 15 receives regional disc addresses from update computer 14, reads the disc and forwards the regional data in data blocks through decompressor 20 into district memory 22.

Figure 4:
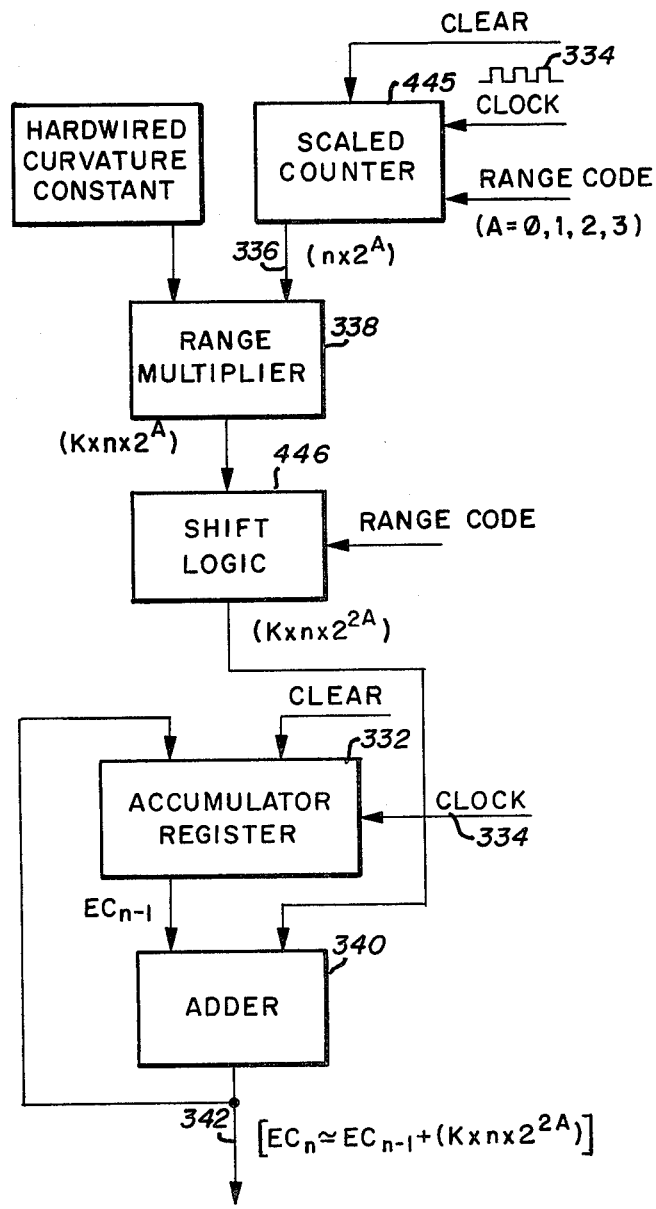
FIG. 4 is a block diagram of a fixed earth curvature circuit similar to FIG. 3 with a radar range selection provision.

Update controller 28 receives district addresses from update computer 14 and orientation information from district memory 22 and correlates the district update data with the district address commands from update computer 14. Thus, as aircraft 12 moves through the gaming area in simulated flight, update computer 14 constantly provides district memory 22 with position update data.

Particular portions of the update data in district memory 22 are further transferred in miniblocks to a sector memory 40 in response to the antenna parameters from aircraft 12 to scan computer 16. Scan computer 16 provides district address to a scan district controller 42, which also receives orientation information from district memory 22. Scan district controller 42 correlates the district address commands from scan computer 16 with district memory 22 for transferring more particular update data, or can data, into sector memory 40. Sector memory 40 has reflectance section 46R which receives scan reflectance data and an elevational section 46E which receives scan elevational data. The scan data is alternately entered; first into sector core memories 48Ra and 48Ea, and second into sector core memories 48Rb and 48Eb in response to a sector controller 50R and 50E. Sector controller 50 correlates the antenna scan data with each antenna sweep and forwards the data from selected core addresses, (sweep data) into a radar equation subsystem 52. RES 52 calculates the brightness of each data point on each sweep of the simulated radar display on a radar screen 54. Screen 54 is preferably on aircraft 12 and interfaces with RES 52 through digital to analog converter 56. Each curvature subsystem 58 provides an elevation correction for each range point as it passes through RES 52.

FIG. 2 shows a simulated aircraft 12 in flight over the earth's curved surface 212. In the digital radar simulation system, terrain elevation values are referenced from sea level in the regional data base. The sea level reference may be visualized as a plane surface 214, whereas in reality the earth's surface 2 is approximately spherical.

Each simulated radar sweep line is generated by adjacent points of light on a CRT display corresponding to equidistant points Po to Pm in plane 214. The brightness of each point of light is a function of the reflectance and elevational data of points P contained in the regional data base. Each line includes the effect of earth curvature, because each sweep points Po to Pm is corrected from the sea level reference value to form points P'o to P'm along curve 212.

In theory, the correction should be such that the straight line representing the radar sweep line on the sea level reference plane 214 is transformed into a circular arc (great circle) on the spherical earth surface 212. In practice, due to the limited range of typical radar systems (a few hundred miles) in comparison to the size of the earth, a suitable curve such as parabolic arc of similar curvature is substituted with savings in hardware and complexity.

In the theoretical spherical earth case, the earth curvature correction (EC) is introduced by way of an elevation correction.

The EC correction is:

$$EC = Re - \sqrt{(Re)^2 - Rg^2}$$

where, Re = earth radius
Rg = distance (range) from the nadir 16 (Po, P'o)

In the practical case, it is convenient to use the parabolic approximation:

$$EC \approx \frac{1}{2} \frac{Rg^2}{Re}$$

which in the sweep line application becomes:

$$EC_n \approx \frac{1}{2} \frac{Rg n^2}{Re}$$

In the case of P1:

$$EC_1 = \frac{1}{2} \frac{Rg_1^2}{Re}$$

The above expression mathematically develop into an arithmetical progression of m earth correction terms as a function f n and $EC_1$:

$$EC_n \simeq EC_{n-1} + \Delta EC$$
$$\simeq EC_{n-1} + 2nEC_1 + EC_1$$

For practical purposes, since $EC_1$ is extremely small, and $n$ is limted to m, the number of points to be displayed, $2n-1$ can be replaced by $2n$ with neglibible consequences, giving:

$$EC_n \simeq EC_{n-1} + (2n)(EC_1)$$

and $$EC_m \simeq \sum_{n=0}^{n=m} 2nEC_1$$

FIG. 3 shows an example of a circuit for computing the above interative function for the series of $m$ equidistant points Po to Pm in a given sweep line. the earth curvature constant $EC_1$, is represented by K and the factor of two is effected by a left shift of one binary place in the output.

In the preferred embodiment, an input binary counter 330 and an accumulator register 332 are cleared at the start of each radar sweep line. As each point, Po through Pm of equal range increment along the sweep line, is processed, a range clock pulse 334 advances input counter 330. The output 336 of input counter 330 (range count n) is muliplied by K in a binary range muliplier 338. The K is preferably supplied by a curvature control circuit 339. The product Kxn appears at the input to the binary adder 340 where Kxn is added to $EC_{n-1}$ which is the EC value obtained for the previous point, accumulatively. Since the n and EC values for point Po are zero, the answer output 342 of adder 340 for the nadir point 16 at range zero is zero. This zero condition is established by the CLEAR to input counter 330 and accumulator register 332. At t-1, the output range muliplier 338 becomes K in response to the next clock pulse 334. After n iterations, the output 342 of adder 340 is:

$$EC_n \simeq k(n^2 + n)$$

Alternatively, a read-only memory may be substituted for range muliplier 338 and curvature control 339 in block 344, as a function of $n$ exactly as before. Either method will produce an earth curvature correction value $EC_n$ to be subtracted from terrain elevation of equidistant range points Po through Pm. The result is sufficiently accurate for simulation purposes. For example, if K is an eight-bit binary number, the earth curvature corrected terrain elevation will still be within one quarter of one percent of the corresponding corrected elevation obtained by the circular equation after 750 range increments at $P_{450}$, $t_{150}$.

The basic method described above can be refined and extended to provide, for example, range increment slectability and altered earth curvature.

Curvature control 339 may be a hardware constant generator for supplying K as a function of the earth's radius Re. However, control 39 may be adjustable in some applications to vary K and the apparent earth radius. The variable embodiment is useful to simulate effects of atmospheric refraction and other distoring influences found in radar systems. The amount of curvature can be altered simply by changing K which includes the values of $EC_1$. Thus, a smaller value of K simulates less apparent each curvature and vice versa.

FIG. 4 shows a modified digital earth curvature generator which provides for several display ranges by progresively doubling the range increment for example from 250 to 500 to 1000 to 2000 feet. An equal number of points are displayed in each simulated radar sweep line, regardless of selected range causing $EC_1$ to increase in proportion to the range. More specifically, in the parabolic model, $EC_1$ quadruples for each doubling of the range increment, although a small difference error is caused by having replaced $2n-1$ with $2n$ in the aithmetical progression. (this error is typically negligible for the ranges of interest.) In FIG. 4, the successive quadrupling of $EC_1$ (and KXn) is accomplished in two doubling steps: first by a scaled counter 445 which doubles the original RANGE COUNT ($n$) appearing at output 336; and second by a left shift of one place in shift logic 446 which doubles the product ($Kxnx2^a$).

Figure 5:
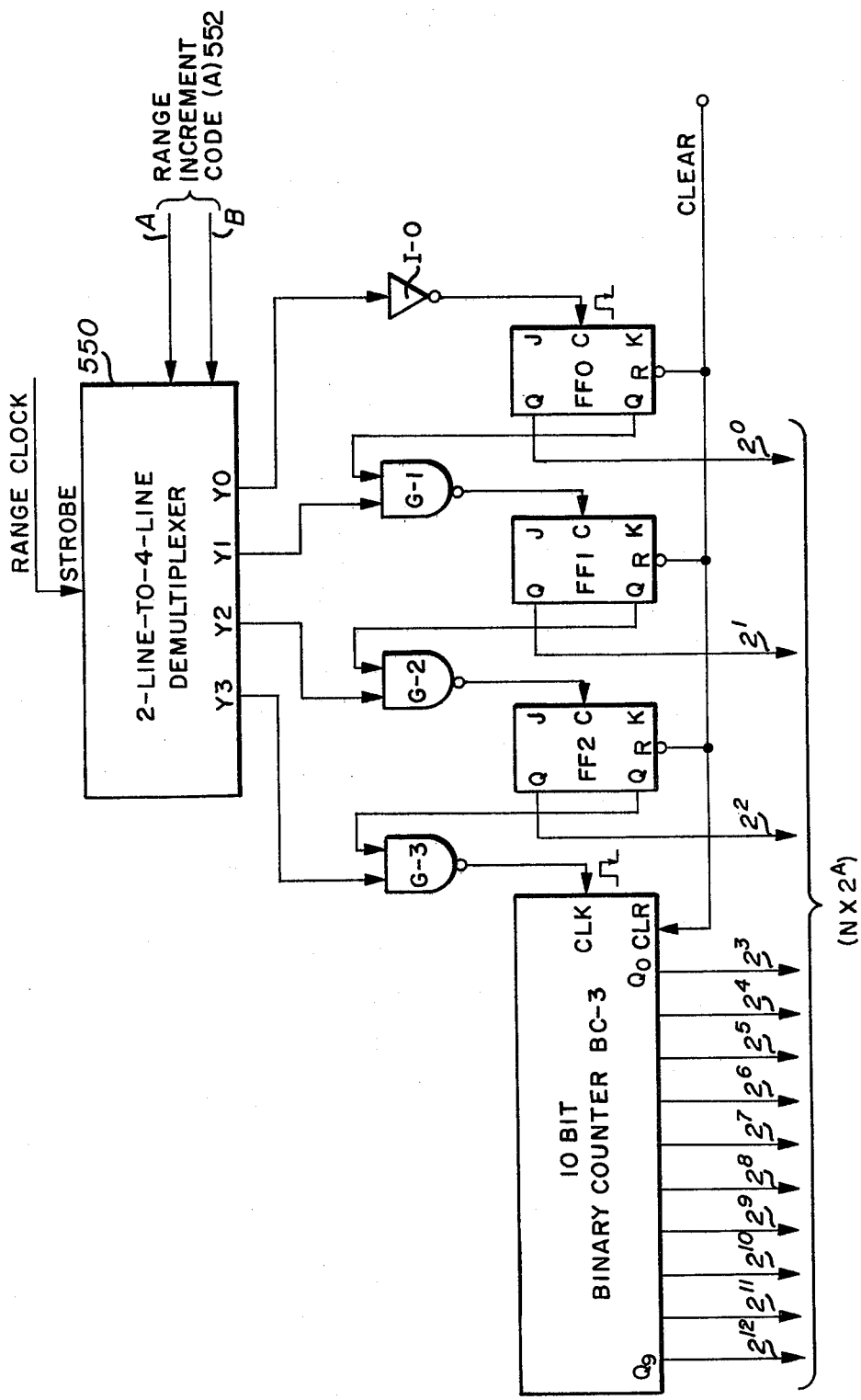
FIG. 5 is a detailed logic circuit of the scaled counter of FIG. 4 showing a four range embodiment.

FIG. 5 is an embodiment of scaled counter 445 of FIG. 4. A 2-line-to-4-line demultiplexer 550 provides four range count outputs in response to a 2-bit range code input 552. The four outputs are applied to an inverter I-0 and to a three NAND gates G-1, G-2 and G-3 respectively which connect to three flip flops FF-0 FF-1, FF-2 and a binary counter BC-3 for determining which outputs $2^0$, $2^1$, $2^2$, and $2^3$ should participate in the range count (n) at output 336. This embodiment provides for up to 1024 points at any of the four resolutions. The RANGE INCREMENT CODE would be 00, 01, 10 and 11 (binary) corresponding to the 250, 500, 1000 and 2000 foot increments, respectively, in the example.

Shift logic 446 of FIG. 4 responds to these same codes to shift the product ($k \times n \times 2^4$) 0, 1, 2 or 3 binary places to the left, respectively, thus completing the desired quadrupling effect. Suitable devices such as shift registers, cascaded logic gates or scaler devices are available for this function.

The following patent applications filed herewith by the present assignee further describe additional features of the pesent digital radar system:

"Simulated Digital Radar System with Log-Antilog Computation Subsystems" patent application SN 692,816 (continuation of Sn 499,262 filed 21 Aug. 1974 now abandoned) filed by Kanwalnain S. Rekhi and David F. Windsor.

"Simulated Digital Radar System with Data Block Mapping Technique," patent application docket number SN 692,815 (continuation of SN 499,261 filed 21 Aug. 1974) now abandoned filed by Steve Mori.

I claim:

1. An earth curvature correction circuit adapted for use in a digital radar landmass system for accumulatively decreasing the terrain elevation of each range point thereof to simulate the effect of the earth's curvature, comprising:

a range point counter having an output which increases during each sweep line and which remains proportional to the current range point;

a curvature control having an output proportional to the desired radius curvature;

a multiplier which forms the product of the range output of the counter and the curvature output of the control;

an adder which forms the sum for each range point of the multipler product plus the multiplier product for the previous range point; and output register for temporarily holding the sum for each range point for outputting and for returning each sum to the adder to be added to the next range point product to form the next range point sum.

2. The circuit of claim 1, wherein:

the output of the range point counter is n and increases for each range point;

the output of the curvature control is a constant K;

the output of the multiplier is Kxn;

the output of the adder is $Kxn + EC_{n-1}$ where $EC_{n-1}$ is the earth curvature correction output of the previous range point $n-1$; and the output of the output register is $EC_n = K(n^2 + n)$.

3. The circuit of claim 2, wherein the curvature control constant K represents the curvature of the earth and atmospheric effects.

4. The circuit of claim 2, wherein the curvature control constant K represents only the curvature of the earth.

5. The circuit of claim 2, wherein K may be increased or decreased.

* * * * *